US006939613B2

(12) United States Patent
Takahashi et al.

(10) Patent No.: US 6,939,613 B2
(45) Date of Patent: Sep. 6, 2005

(54) OPTICAL MEMBER, PROCESS OF PRODUCING OPTICAL MEMBER, AND PROCESS OF PRODUCING THIN FILM

(75) Inventors: Yukihiro Takahashi, Tokyo (JP); Masakazu Matsumoto, Tokyo (JP)

(73) Assignee: HOYA Corporation, Tokyo (JP)

( * ) Notice: Subject to any disclaimer, the term of this patent is extended or adjusted under 35 U.S.C. 154(b) by 4 days.

(21) Appl. No.: 10/390,281

(22) Filed: Mar. 18, 2003

(65) Prior Publication Data

US 2003/0181044 A1 Sep. 25, 2003

(30) Foreign Application Priority Data

Mar. 18, 2002 (JP) .................................... 2002-073853

(51) Int. Cl.[7] .............................................. B32B 9/04

(52) U.S. Cl. ...................... 428/447; 428/413; 428/421; 428/446; 427/387

(58) Field of Search ............................... 428/446, 447, 428/413, 421; 427/387

(56) References Cited

U.S. PATENT DOCUMENTS

| | | | | | |
|---|---|---|---|---|---|
| 5,576,885 | A | | 11/1996 | Lowe et al. | |
| 5,909,314 | A | | 6/1999 | Oka et al. | |
| 6,235,833 | B1 | * | 5/2001 | Akamatsu et al. | 524/588 |
| 6,318,842 | B1 | * | 11/2001 | Shimomura et al. | 347/45 |
| 6,511,753 | B1 | * | 1/2003 | Teranishi et al. | 428/447 |
| 6,660,392 | B2 | * | 12/2003 | Yamaguchi et al. | 428/446 |
| 2002/0192472 | A1 | * | 12/2002 | Metz et al. | 428/426 |
| 2004/0021966 | A1 | * | 2/2004 | Takahashi et al. | 359/883 |

FOREIGN PATENT DOCUMENTS

| | | |
|---|---|---|
| EP | 1 112 981 A1 | 7/2001 |
| JP | 50-006615 | 1/1975 |
| JP | 58-122979 | 7/1983 |
| JP | 58-172242 | 10/1983 |
| JP | 58-172246 | 10/1983 |
| JP | 60-040254 | 3/1985 |
| JP | 60-221470 | 11/1985 |
| JP | 61-130902 | 6/1986 |
| JP | 62-148902 | 7/1987 |
| JP | 05-215905 | 8/1993 |
| JP | 09-157582 | 6/1997 |
| JP | 09-202648 | 8/1997 |
| JP | 09-263728 | 10/1997 |
| JP | 10-130844 | 5/1998 |
| JP | 11-320743 | 7/2001 |
| WO | 2000/66353 | 11/2000 |

OTHER PUBLICATIONS

English Translation of JP 05–215905 from JPO website, Kono, Aug. 1993.*

English Translation of JP 2003–014904 from JPO website, Kono, Jan. 2003.*

* cited by examiner

*Primary Examiner*—Jeffrey B. Robertson
(74) *Attorney, Agent, or Firm*—Finnegan, Henderson, Farabow, Garrett & Dunner, LLP

(57) ABSTRACT

An optical member having improved durability characteristics and a process of producing an optical member are provided. The optical member has an antireflection film on a substrate, wherein an outermost layer of the antireflection film is a layer containing, as a major component, vapor deposited silicon dioxide. The outermost layer is further externally provided with a fluorine-containing water-repellent layer. The optical member has the following characteristics: (1) after the water-repellent layer is initially provided, a stationary contact angle (stationary contact angle before rubbing) to water is 104° or more; and (2) after a chamois skin is dipped in water at 25° C. for 5 minutes, and the surface of the water-repellent layer is then rubbed 10,000 times by the chamois skin while applying a load of 500 g, a stationary contact angle (stationary contact angle after rubbing) is from 0 to 10° smaller than the stationary contact angle before rubbing.

25 Claims, 1 Drawing Sheet

OPTICAL MEMBER, PROCESS OF PRODUCING OPTICAL MEMBER, AND PROCESS OF PRODUCING THIN FILM

CROSS-REFERENCE TO RELATED APPLICATION

The present application claims priority under 35 U.S.C. § 119 of Japanese Application No. 2002-073853, filed Mar. 18, 2002, the disclosure of which is expressly incorporated by reference herein.

DESCRIPTION

1. Field of the Invention

The present invention relates to an optical member having a water-repellent thin film having excellent durability and to a process of producing an optical member.

2. Background of the Invention

Antireflection films provided on optical members such as lenses are generally formed from an inorganic oxide such as $ZrO_2$ and $SiO_2$. For this reason, stains by perspiration or fingerprints are liable to attach thereto, and it is difficult to remove these stains. In order to solve such a problem, water-repellent films are often provided on the antireflection film.

In recent years, it has been desired that the water-repellant performance of such a water-repellent film is maintained for as long as possible. As a method of obtaining this performance, JP-A-5-215905 discloses a method in which an organosilicon compound is subjected to heat vapor deposition in vacuum to form a water-repellent film on an antireflection film.

However, in the method disclosed in JP-A-5-215905, a difference in stationary contact angle to water before and after promotion processing of the durability as described below is from 10° to 13°. Thus, further improvement in the performance is desirable.

SUMMARY OF THE INVENTION

An embodiment of the invention provides an optical member having improved durability characteristics and a process of producing an optical member.

The present inventors have discovered an optical member comprising a substrate and an antireflection film on the substrate. The outermost layer from the substrate of the antireflection film is a layer containing, as a major component, vapor deposited silicon dioxide. A fluorine-containing water-repellent layer is further externally provided on the outermost layer of the antireflection film. The optical member has the following characteristics: (1) after the water-repellent layer is initially provided, a stationary contact angle (stationary contact angle before rubbing) to water of the water-repellent layer is 104° or more; and (2) after a chamois skin is dipped in water at 25° C. for 5 minutes, and the surface of the water-repellent layer is then rubbed 10,000 times by the chamois skin while applying a load of 500 g, a stationary contact angle (stationary contact angle after rubbing) to water is from 0 to 10° smaller than the stationary contact angle before rubbing.

The present invention furthermore relates to a process of producing an optical member which comprises heating a fluorine-substituted alkyl group-containing organosilicon compound optionally diluted with a solvent in vacuum and depositing a thin film on a substrate by heating the organosilicon compound. A heating temperature of the organosilicon compound is in the range of from an evaporation initiation temperature of the organosilicon compound to a decomposition temperature of the organosilicon compound, and a time from the initiation of heating of the organosilicon compound (which includes the phase of increasing the temperature of evaporation initiation temperature) to the completion of applying heat is no more than 90 seconds.

DESCRIPTION OF THE INVENTION

Figure 1:
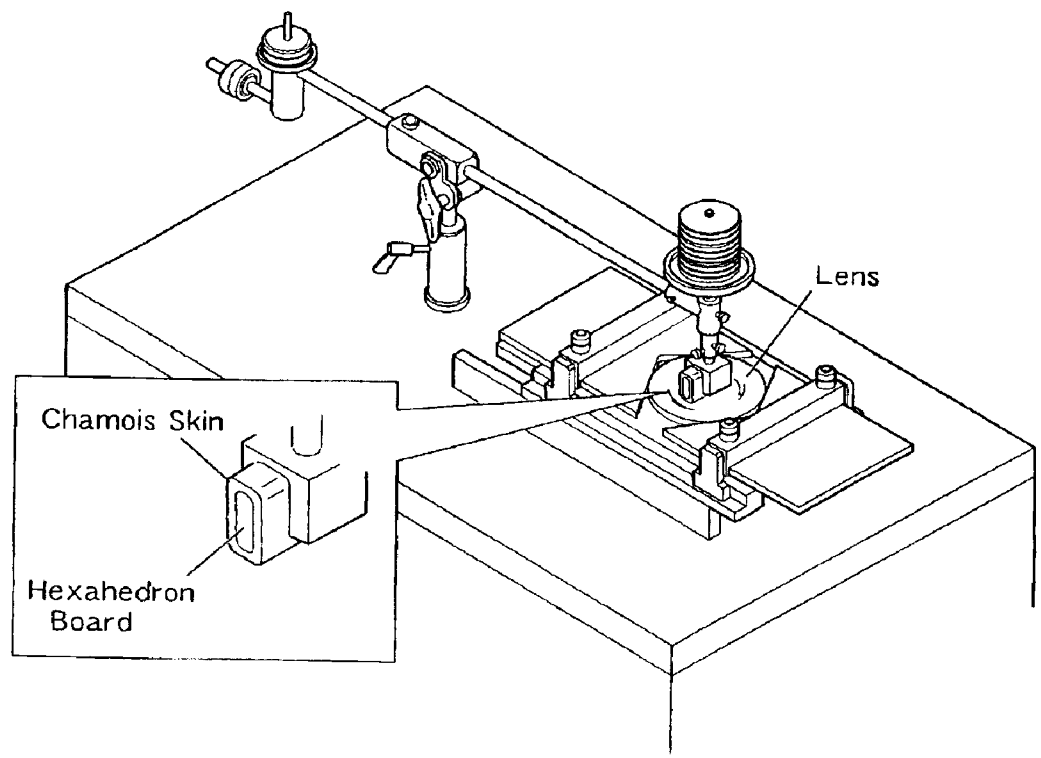
FIG. 1 shows a schematic drawing of the device that can be used for measuring the long term durability characteristics of the optical member according to this invention.

The particulars shown herein are by way of example and for purposes of illustrative discussion of the various embodiments of the present invention only. In this regard, no attempt is made to show details of the invention in more detail than is necessary for a fundamental understanding of the invention, the description making apparent to those skilled in the art how the several forms of the invention may be embodied in practice.

Unless otherwise stated, a reference to a compound or component, includes the compound or component by itself, as well as in combination with other compounds or components, such as mixtures of compounds.

As an overview, the present invention relates to an optical member comprising a substrate and an antireflection film on the substrate. An outermost layer from the substrate of the antireflection film is a layer containing, as a major component, vapor deposited silicon dioxide. A fluorine-containing water-repellent layer is further externally provided on the outermost layer. The optical member has the following characteristics: (1) after the water-repellent layer is initially provided, a stationary contact angle (stationary contact angle before rubbing) to water of the water-repellent layer is 104° or more; and (2) after a chamois skin is dipped in water at 25° C. for 5 minutes, and the surface of the water-repellent layer is then rubbed 10,000 times by the chamois skin while applying a load of 500 g, a stationary contact angle (stationary contact angle after rubbing) to water is from 0 to 10° smaller than the stationary contact angle before rubbing.

The present invention also relates to a process of producing an optical member which comprises heating a fluorine-substituted alkyl group-containing organosilicon compound diluted with a solvent in vacuum and depositing a thin film on a substrate by heating the organosilicon compound. A heating temperature of the organosilicon compound is in the range of from an evaporation initiation temperature of the organosilicon compound to the decomposition temperature of the organosilicon compound, and a time from the initiation of heating of the organosilicon compound (which includes the phase of increasing the temperature to the evaporation initiation temperature) to the completion of applying heat is within 90 seconds.

The optical member according to the invention is an optical member having a substrate and an antireflection film on the substrate, which is characterized in that an outermost layer from the substrate in the antireflection film is a layer containing, as a major component, vapor deposited silicon dioxide. The expression 'major component' indicates a content of at least 50% by weight of silicon dioxide, preferably a content of at least 70% by weight. A fluorine-containing water-repellent layer is further externally provided on the outermost layer. Examples of the fluorine-containing water-repellent layer include those obtained from a water-repellent composition that can be subjected to heat vapor deposition. Examples of the water-repellent composition are disclosed in JP-A-61-130902, JP-A-58-172246, JP-A-58-122979, JP-A-58-172242, JP-A-60-40254, JP-A-50-6615, JP-A-60-221470, JP-A-62-148902, JP-A-9-157582, JP-A-9-202648, and JP-A-9-263728.

Examples of the composition for producing the fluorine-containing water-repellent layer include a solution containing fluorine-substituted alkyl group-containing organosilicon compound. The water-repellent layer may be formed from fluorine-substituted alkyl group-containing organosilicon compound as a raw material. For instance, the fluorine-substituted alkyl group-containing organosilicon compound may be a compound represented by the following general formula (I):

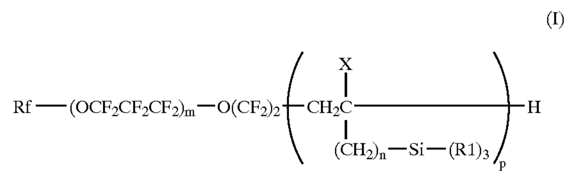

wherein Rf represents a linear perfluoroalkyl group having from 1 to 16 carbon atoms; X represents hydrogen or a lower alkyl group having from 1 to 5 carbon atoms; R1 represents a hydrolyzable group; m represents a number ranging from 1 to 50; n represents a number ranging from 0 to 2; and p represents a number ranging from 1 to 10.

Examples of the hydrolyzable group represented by R1 include an amino group, an alkoxy group (for example, one containing 1 to 2 carbon atoms in its alkyl moiety), and a chlorine atom.

From the standpoint of obtaining a good thin film, the fluorine-substituted alkyl group-containing organosilicon compound may have a weight-average molecular weight ranging from 3,500 to 6,500 g/mol.

Another example of the fluorine-substituted alkyl group-containing organosilicon compound is a compound represented by the following unit formula (II):

$$C_qF_{2q+1}CH_2CH_2Si(NH)_{1.5} \quad \text{(II)}$$

wherein q represents an integer of 1 or more. From the standpoint of obtaining particularly good physical properties, such a compound may have a weight average molecular weight of from 300 to 700 g/mol.

Specific examples include n-$CF_3CH_2CH_2Si(NH_2)_3$; n-trifluoro(1,1,2,2-tetrahydro)propylsilazane; n-$C_3F_7CH_2CH_2Si(NH_2)_3$; n-heptafluoro(1,1,2,2-tetrahydro) pentylsilazane; n-$C_4F_9CH_2CH_2Si(NH_2)_3$; n-nonafluoro(1,1,2,2-tetrahydro)-hexylsilazane; n-$C_6F_{13}CH_2CH_2Si(NH_2)_3$; n-tridecafluoro(1,1,2,2-tetrahydro)-octylsilazane; n-$C_8F_{17}CH_2CH_2Si(NH_2)_3$; and n-heptadecafluoro(1,1,2,2-tetrahydro)decylsilazane.

Incidentally, examples of commercially available water-repellent processing agents include KP-801 (a trade name, manufactured by Shin-Etsu Chemical Co., Ltd.), X-71-130 (a trade name, manufactured by Shin-Etsu Chemical Co., Ltd.), and OPTOOL DSX (a trade name, manufactured by Daikin Industries, Ltd.).

In the optical member according to the invention, the stationary contact angle (stationary contact angle before rubbing) to water of the water-repellent layer is 104° or more, for example, in the range of from 104° to 120°, in order to achieve a good water repellent performance.

Further, the optical member according to the invention may have a performance such that when a chamois skin is dipped in water at 25° C. for 5 minutes, and the surface of the water-repellent layer is then rubbed 10,000 times in a forward and backward movement by the chamois skin while applying a load of 500 g, a stationary contact angle (stationary contact angle after rubbing) to water is from 0 to 10° smaller than the stationary contact angle to water before rubbing. A suitable device for carrying out the rubbing experiment is shown in FIG. 1. From the standpoint of durability, a degree of reduction in the stationary contact angle may range, for example, from 0 to 8°, 0 to 6°, 1 to 4°, or 2 to 30°.

Moreover, in the optical member according to the invention, a luminous reflectance of the optical member may be substantially identical before and after providing the water-repellent layer. The expressions "substantially identical" as used in the context of this invention indicates a variation of ±1%, preferably ±0.1%. This is because when the luminous reflectance of the optical member is substantially identical before and after providing the water-repellent layer, the water-repellent layer does not lower the performance of the optical member.

A film thickness of the thin film for forming the fluorine-containing water-repellent layer varies basically depending upon the residual amount following evaporation of the fluorine-substituted alkyl group-containing organosilicon compound. Accordingly, when the thin film is controlled in an angstrom order, a solution of the fluorine-substituted alkyl group-containing organosilicon compound diluted with a solvent may be used. Examples of the fluorine-based solvents include m-xylene hexafluoride, perfluorohexane, and hydrofluoroethers such as methyl octafluorobutyl ether, methyl monofluorobutyl ether, and methyl decafluorobutyl ether.

Further, a concentration of the fluorine-substituted alkyl group-containing organosilicon compound in the solution is not particularly limited so far as the desired object is attained, but can be properly determined while taking into consideration the kind of the fluorine-substituted alkyl group-containing organosilicon compound and the desired film thickness of the thin film.

In order to enhance the slipperiness of the surface, a silicon-free perfluoropolyether may be mixed with the fluorine-substituted alkyl group-containing organosilicon compound. Examples of the silicon-free perfluoropolyether include those having a varied structure. The compounds include those comprising a unit represented by the following general formula (III):

$$\text{—(RO)—} \quad \text{(III)}$$

wherein R represents a perfluoroalkylene group having from 1 to 3 carbon atoms. The above perfluoropolyether may have a weight average molecular weight of from 1,000 to 10,000 g/mol., such as from 2,000 to 10,000 g/mol. Examples of R include $CF_2$, $CF_2CF_2$, $CF_2CF_2CF_2$, and $CF(CF_3)CF_2$. These perfluoropolyethers (hereinafter referred to as "PFPE") are liquid at normal temperature and are generally called fluorocarbon oils.

Examples of PFPE that can be used in the invention include trade name products DEMNUM Series (S-20 (weight average molecular weight: 2,700 g/mol.), S-65 (weight average molecular weight: 4,500 g/mol), and S-100 (weight average molecular weight: 5,600 g/mol.)) manufactured by Daikin Industries, Ltd., trade name products BARRIERTA Series manufactured by NOK Kluber Co., Ltd., trade name products FOMBLIN Series manufactured by Asahi Glass Co., Ltd., trade name products KRYTOX Series manufactured by E.I. du Pont de Nemous & Company, and a trade name product MOLYKOTE HF-30 oil manufactured by Dow Corning Corp.

The two components of the fluorine-substituted alkyl group-containing organosilicon compound and the silicon-free perfluoropolyether may be mixed, and using a raw material comprising these compounds as the major components, a water-repellent layer may be provided. A weight ratio of the silicon-free perfluoropolyether to the fluorine-substituted alkyl group-containing organosilicon compound in the solution that is used for forming the water-repellent layer may range from 0.01:1 to 100:1.

The fluorine-substituted alkyl group-containing organosilicon compound solution may be charged in a vessel and heated as it stands. However, from the standpoint of obtaining many uniform vapor deposited films, it is more preferred to impregnate it in a porous material. Examples of the porous material include sintered filters prepared by sintering a powdered metal having high heat conductivity, such as copper and stainless steel.

Further, from the standpoint of obtaining a proper vapor deposition rate, the porous material suitably may have a mesh size ranging from 40 to 200 microns, such as from 80 to 120 microns.

The fluorine-substituted alkyl group-containing organosilicon compound may be vapor deposited on a substrate by heat vapor deposition. In this case, the vapor deposition may be carried out upon heating in vacuum. A degree of vacuum within a vacuum vapor deposition unit is not particularly limited. However, from the standpoint of obtaining a uniform water-repellent film, it may range from $10^{-3}$ to $10^{-8}$ Torr, such as from $5.0\times10^{-3}$ to $6.0\times10^{-6}$ Torr.

The temperature during heating of the fluorine-substituted alkyl group-containing organosilicon compound varies depending upon the kind of the organosilicon compound and the vacuum condition for vapor deposition. But, the heating temperature of the organosilicon compound may be in the range of a vapor deposition initiation temperature of the organosilicon compound or higher but not exceeding a decomposition temperature of the organosilicon compound in the desired degree of vacuum. The vapor deposition initiation temperature is defined as the temperature at which the vapor pressure of the solution containing the organosilicon compound is equal to the applied vacuum. The decomposition temperature of the organosilicon compound is the temperature at which 50% of a specified amount of the organosilicon compound decomposes within a period of time of 1 minute (under nitrogen and in the absence of any reactive compounds).

With respect to the vapor deposition rate, under the condition for keeping the heating temperature within the foregoing range, it is preferred that a time from the initiation of heating of the organosilicon compound to the completion of vapor deposition may be within 90 seconds. Shorter heating times such as within 50 seconds, within 40 seconds, within 30 seconds, within 20 seconds, and within 10 seconds are possible. The heating time may also be within 5 seconds. By completing the vapor deposition within the above-specified temperature range and for a short period of time, i.e., giving a high energy to the organosilicon compound for a short period of time, it is possible to provide an optical member having a water-repellent film having excellent durability. Further, even when a water-repellent agent composed of two components having a different vapor deposition initiation temperature is used, it is possible to undergo the vapor deposition substantially simultaneously and to obtain a uniform film if a heating temperature is chosen which preferably ranges from the higher vapor deposition initiation temperature of the two compounds to the lower decomposition temperature of the two compounds.

An example of a method of attaining the above-specified vapor deposition rate is a method in which electron beams are irradiated to the organosilicon compound. In a method of emitting electron beams, an electron gun that is conventionally employed in a vapor deposition unit can be used. By using the electron gun, it is possible to irradiate a uniform energy to the whole of the organosilicon compound, whereby it becomes easy to provide a uniform water-repellent film.

The power of the electron gun varies depending upon the substances to be used, the vapor deposition unit, the degree of vacuum, and the irradiation area. The accelerating voltage may be approximately 6 kV, and the application current may range from about 5 to 80 mA.

When the optical member is produced by the above method, there are obtained characteristics such that when the water-repellent layer is provided, a stationary contact angle (stationary contact angle before rubbing) to water may be 104° or more and that when a chamois skin is dipped in water at 25° C. for 5 minutes, and the surface of the water-repellent layer is then rubbed 10,000 times by the chamois skin while applying a load of 500 g, a stationary contact angle (stationary contact angle after rubbing) may range from 0 to 10° smaller than the stationary contact angle before rubbing. Thus, as compared to conventional methods, an optical member having the water-repellent layer with a high durability can be provided.

In addition, according to this method, the film thickness of the water-repellent film can be controlled. Also according to this method, adding the water-repellent film generally does not substantially affect the luminous reflectance of the optical member. Similarly, adding the water-repellent film generally does not substantially affect the luminous transmittance of the optical member. The luminous transmittance is measured according to the International Standard 8980-3 published in 1999 by the International Organization for Standardization (ISO), Case postale 56, CH-1211 Geneva 20, www.iso.ch, and the luminous reflectance is determined according to the standard ISO 8980-4, published by the ISO in 2000.

Incidentally, as the chamois skin is useful grade A or B as defined in KK-C-300C according to the Federal Specifications and Standards of U.S.A., as published by the U.S. Government Printing Office, document Nos. 1963-653355/340, 1969 0-395-523 (4077) and 1972 0-482-195 (3363).

Further, the optical member as referred to in the invention means an optical member in the broad sense inclusive of not only spectacle lenses but also camera lenses, optical filters annexed to displays to word processor and automobile window shields.

Examples of the optical substrate that is used in the invention include plastic-made optical substrates such as methyl methacrylate homopolymers, copolymers made of monomer components comprising methyl methacrylate and at least one other monomer, such as a monomer having a vinyl group, diethylene glycol bisallyl carbonate homopolymers, copolymers made of monomer components comprising diethylene glycol bisallyl carbonate and at least one other monomer, such as a monomer having a vinyl group, sulfur-containing copolymers, halogen-containing copolymers, polycarbonates, polystyrenes, polyvinyl chlorides, unsaturated polyesters, polyethylene terephthalates, and polyurethanes, and inorganic glass-made optical substrates. Incidentally, the substrate may be a substrate having a hardcoat layer provided thereon. Examples of the hardcoat layer include cured films containing an organosilicon compound, an acrylic compound, or the like.

Further, the antireflection film (vapor deposited film) as referred to herein means a single or multilayered film (with proviso that an $SiO_2$ film be provided as an outermost layer), formed from, for example, $ZrO_2$, $SiO_2$, $TiO_2$, $Ta_2O_5$, $Y_2O_3$, $MgF_2$, or $Al_2O_3$, or a colored film of, for example, $CrO_2$ (with proviso that an $SiO_2$ film be provided as an outermost layer), which is provided for the purpose of reducing the reflection of the surface of an optical substrate of, for example, a lens. As noted above, a layer containing silicon dioxide as the major component may be used as the outermost layer of the antireflection film. Here, silicon dioxide as the major component refers to a layer consisting substantially of silicon dioxide, or a hybrid layer comprising silicon dioxide and an organic substance. Suitable organic substances are modified silicon oils and other organic substances described in U.S. patent application Ser. No. 10/279,931 which is incorporated herein by reference.

As described above in detail, the optical member according to the invention has a high durability characteristic, and according to the production process according to the invention, it is possible to produce an optical member having a high durability characteristic.

The invention will be specifically described below with reference to the Examples, but it should not be construed that the invention is limited thereto.

EXAMPLES

1. Preparation of Antireflection Film-Provided Plastic Lens:

Using a diethylene glycol bisallyl carbonate polymer-based lens (HI-LUX, a trade name, manufactured by Hoya Corporation, refractive index: 1.499, diopter: 0.00) as a plastic lens, a cured film as disclosed in JP-A-63-10640 was provided on the plastic lens substrate. Specifically, 2.0 parts by weight of 0.5N hydrochloric acid and 20 parts by weight of acetic acid were added to 240 parts by weight of colloidal silica having an $SiO_2$ concentration of 40% by weight (SNOWTEX 40, trade name, a water dispersion of silica manufactured by Nissan Chemical Industries, Ltd.) to prepare a solution, to which was then added dropwise 95 parts by weight of γ-glycidoxypropyl trimethoxysilane (trifunctional organosilicon compound) with stirring at 35° C. The mixture was stirred at room temperature for 8 hours and then allowed to stand at room temperature for 16 hours. To this hydrolysis solution were added 80 parts by weight of methyl cellosolve, 120 parts by weight of isopropyl alcohol, 40 parts by weight of butyl alcohol, 16 parts by weight of aluminum acetylacetone, 0.2 parts by weight of a silicone-based surfactant, and 0.1 parts by weight of a UV absorber. The mixture was stirred for 8 hours and then aged at room temperature for 24 hours to obtain a coating composition. The composition was coated at a lifting rate of 15 cm/min by the dipping method, allowed to stand at room temperature for 15 minutes, and then heat cured at 120° C. for 2 hours to provide a cured film.

Next, an undercoat layer [refractive index: 1.46, film thickness: 0.5 λ(λ=550 nm)] consisting of silicon dioxide was formed on the cured film by the vacuum vapor deposition method (degree of vacuum: $2\times10^{-5}$ Torr). On the undercoat layer was formed a first layer [refractive index: 1.70, film thickness: 0.24 λ] that was a three-layer equivalent film comprising a layer (film thickness: 0.06 λ) made of titanium dioxide obtained by the ion beam assisted deposition method, a layer (film thickness: 0.12 λ) made of silicon dioxide obtained by the vacuum vapor deposition method, and a layer (film thickness: 0.06 λ) made of titanium dioxide obtained by the ion beam assisted deposition method. On the first layer was formed a second layer (refractive index: 2.40, film thickness: 0.5 λ) made of titanium dioxide obtained by the ion beam assisted deposition method, and on the second layer was formed a third layer (refractive index: 1.46, film thickness: 0.25 λ) made of silicon dioxide obtained by the vacuum vapor deposition method (degree of vacuum: $2\times10^{-5}$ Torr). There was thus obtained an antireflection film-provided plastic lens. This lens had a luminous reflectance of 0.4%.

2. Water-Repellent Agents as Used:

(1) Water-Repellent Processing Agent 1:

OPTOOL DSX (a trade name, manufactured by Daikin Industries, Ltd.) that is a fluorine-substituted alkyl group-containing organosilicon compound was used as water-repellent processing agent 1.

(2) Water-Repellent Processing Agent 2:

A solution of a fluorine-containing organosilicon compound (weight average molecular weight: about 5,000 g/mol.) represented by a unit formula, $C_3F_7$-$(OCF_2CF_2CF_2)_{24}$—$O(CF_2)_2$—$[CH_2CH(Si—(OCH_3)_3)]_{1-10}$, diluted with 3% by weight of perfluorohexane was used as water-repellent processing agent 2.

(3) Water-Repellent Processing Agent 3:

A solution of a fluorine-containing organosilicon compound (weight average molecular weight: about 2,000 g/mol.) represented by a unit formula, $C_3F_7$-$(OCF_2CF_2CF_2)_6$—$O(CF_2)_2$—$[CH_2CH(Si—(OCH_3)_3)]_{1-10}$,diluted with 3% by weight perfluorohexane was used as water-repellent processing agent 3.

(4) Water-Repellent Processing Agent 4:

A solution (KP-801, a trade name, manufactured by Shin-Etsu Chemical Co., Ltd.) of a fluorine-containing organosilicon compound represented by a unit formula, $C_8F_{17}CH_2CH_2Si(NH)_{1.5}$, diluted with 3% by weight of m-xylene hexachloride was used as water-repellent processing agent 4.

(5) Water-Repellent Processing Agent 5:

A mixture of OPTOOL DSX (a trade name, manufactured by Daikin Industries, Ltd.) as the fluorine-substituted alkyl group-containing organosilicon compound and a silicon-free perfluoropolyether (trade name: DEMNUM Series S-100, manufactured by Daikin Industries, Ltd., weight average molecular weight: 5,600 g/mol.) was used as water-repellent processing agent 5.

(6) Water-Repellent Processing Agent 6:

X-71-130 (a trade name, manufactured by Daikin Industries, Ltd.) as the fluorine-substituted alkyl group-containing organosilicon compound was used as water-repellent processing agent 6.

(7) Water-Repellent Processing Agent 7:

A mixture of X-71-130 (a trade name, manufactured by Daikin Industries, Ltd.) as the fluorine-substituted alkyl group-containing organosilicon compound and a silicon-free perfluoropolyether (a trade name: DEMNUM Series S-20, manufactured by Daikin Industries, Ltd., weight average molecular weight: 2,700 g/mol.) was used as water-repellent processing agent 7.

3. Evaluation of Physical Properties:

The plastic lenses obtained in the Examples and Comparative Examples were evaluated for physical properties in the following evaluation methods.

(1) Stationary Contact Angle to Water

Using a contact angle meter (CA-D Model, manufactured by Kyowa Interface Science Co., Ltd.), a drop of water having a diameter of 2 mm was prepared at the tip of a needle at room temperature and brought into contact with an uppermost portion of the convex surface of the lens to prepare a droplet. At this time, an angle between the droplet and the surface as generated was measured as the stationary contact angle by determining the radius r of the base of the droplet (i.e. the radius of the surface of the lens that is in contact with the droplet) and the height h of the droplet, and by calculating the contact angle θ according to the following equation:

$$\theta=2\times\tan^{-1}(h/r)$$

wherein the measurement is carried out within 10 seconds after placing the droplet on the lens in order to minimize errors caused by evaporation of the water.

(2) Appearance:

It was visually examined whether or not mottle of the interference color and change of the interference color appeared, thereby evaluating whether or not the plastic lens had an appearance useful as a spectacle lens.

(3) Durability:

A chamois skin was dipped in water at 25° C. for 5 minutes and then taken out into air. After one minute of keeping the chamois skin under air (25° C., 50 to 60% humidity), this chamois skin was used to rub the surface of the plastic lens having a water-repellent film 5,000 times and 10,000 times in a forward and backward movement while applying a load of 500 g (in air of 25° C., 50 to 60% humidity), and a stationary contact angle of the resulting lens to water was measured in the same manner as described in (1) above. 65 minutes were spent during rubbing 5,000 times and 130 minutes were spent during rubbing 10,000 times. Incidentally, as the chamois skin was grade B as defined in KK-C-300C according to the Federal Specifications and Standards of U.S.A and the chamois skin, which was produced by Kubota-Shikawaga Corp. was used. FIG. 1 shows a drawing of an apparatus which was used in durability test.

(4) Luminous Reflectance (One Surface):

Luminous reflectance was measured by using an autographic spectrophotometer, U-3410 Model manufactured by Hitachi, Ltd.

Example 1

A stainless steel-made sintered filter (mesh size: from 80 to 100 microns, 18 mm diameter, thickness 3 mm) having 0.15 mL of the water-repellent processing agent 1 immersed therein was set within a vacuum vapor deposition unit, and the whole of the sintered filter was heated by using an electron gun under the following condition, to form a water-repellent film on the antireflection film-provided plastic lens.

(1) Degree of Vacuum: from $2.3\times10^{-6}$ to $6.0\times10^{-6}$ Torr (2) Condition of Electron Gun:

Accelerating voltage: 6 kV, application current: 40 mA, irradiation area: 3.5×3.5 cm square, vapor deposition time: 5 seconds

Examples 2 to 10

Water-repellent films were formed in the same manner as in Example 1 under the conditions set forth in Table 1. In Examples 2 to 4, the water-repellent agent was changed relative to Example 1. In Examples 5 to 10, the water-repellent agent of Example 1 was used, but the vapor deposition time was changed. The evaluation results are shown in Table 2.

Examples 11 to 13

By using the fluorine-substituted alkyl group-containing organosilicon compound or a mixed liquid of the fluorine-substituted alkyl group-containing organosilicon compound and the silicon-free perfluoropolyether as the raw material, water-repellent films were formed under the conditions set forth in Table 1 and evaluated. The amounts of the liquids used are shown in Table 1, and the evaluation results are shown in Table 2.

Further, Table 3 shows the results obtained by measuring the lenses obtained in Examples 10 to 13 in terms of coefficient of dynamic friction three times by using a continuous loading type surface property tester, TYPE: 22H, manufactured by Shinto Scientific Co., Ltd. Results in Examples 11 to 13 are superior to that of Example 10.

Comparative Example 1

A water-repellent film was formed in the same manner as in Example 1, except that the stainless steel-made sintered filter having the water-repellent processing agent immersed therein was heated by using a halogen heater and the vapor deposition time was changed to 360 seconds. The results are shown in Table 2.

Comparative Example 2

A water-repellent film was formed in the same manner as in Comparative Example 1, except that the water-repellent processing agent and the liquid amount of the water-repellent agent as set forth in Table 1 were employed and the vapor deposition time was changed to 300 seconds. The results, as shown in Table 2, indicate that the durability of the water-repellent films of the Comparative Examples are inferior to that of the water-repellent films of the Examples.

TABLE 1

| | Heating source as used (mA) | Vapor deposition time sec | Vapor deposition material | Amount of water-repellent agent |
|---|---|---|---|---|
| Example 1 | Electron gun (40) | 5 | Water-repellent agent 1 (DSX) | 0.15 mL |
| Example 2 | Electron gun (40) | 10 | Water-repellent agent 2 | 0.75 mL |
| Example 3 | Electron gun (40) | 10 | Water-repellent agent 3 | 0.75 mL |
| Example 4 | Electron gun (40) | 10 | Water-repellent agent 4 (KP-801) | 0.20 mL |
| Example 5 | Electron gun (40) | 10 | Water-repellent agent 1 (DSX) | 0.15 mL |

TABLE 1-continued

| | Heating source as used (mA) | Vapor deposition time sec | Vapor deposition material | Amount of water-repellent agent |
|---|---|---|---|---|
| Example 6 | Electron gun (40) | 15 | Water-repellent agent 1 (DSX) | 0.15 mL |
| Example 7 | Electron gun (40) | 20 | Water-repellent agent 1 (DSX) | 0.15 mL |
| Example 8 | Electron gun (40) | 30 | Water-repellent agent 1 (DSX) | 0.15 mL |
| Example 9 | Electron gun (40) | 60 | Water-repellent agent 1 (DSX) | 0.15 mL |
| Example 10 | Electron gun (40) | 80 | Water-repellent agent 1 (DSX) | 0.15 mL |
| Example 11 | Electron gun (35) | 60 | Water-repellent agent 5 (DSX + S-100) | 0.15 mL (DSX) 0.025 mL S-100 |
| Example 12 | Electron gun (35) | 60 | Water-repellent agent 6 (X-71-130) | 0.20 mL |
| Example 13 | Electron gun (35) | 60 | Water-repellent agent 7 (X-71-130 + S-20) | 0.20 mL (X-71-1 30) 0.05 mL (S-20) |
| Comparative Example 1 | Halogen heater | 360 | Water-repellent agent 1 (DSX) | 0.15 mL |
| Comparative Example 2 | Halogen heater | 300 | Water-repellent agent 4 (KP-801) | 0.20 mL |

(Note)
The vapor deposition time means a time from the initiation of heating to the completion of vapor deposition.
Degree of vacuum: from $2.3 \times 10^{-6}$ to $6.0 \times 10^{-6}$ Torr
Accelerating voltage: 6 kV

TABLE 2

| | Luminous reflectance % | | Durabilitity (contact angle) | | | |
|---|---|---|---|---|---|---|
| | Before the formation | After the formation | 0 time | 5,000 times | 10,000 times | Appearance |
| Example 1 | 0.4 | 0.4 | 112 | 110 | 109 | Good |
| Example 2 | 0.4 | 0.4 | 110 | 106 | 105 | Good |
| Example 3 | 0.4 | 0.4 | 110 | 105 | 104 | Good |
| Example 4 | 0.4 | 0.4 | 111 | 105 | 102 | Good |
| Example 5 | 0.4 | 0.4 | 113 | 111 | 109 | Good |
| Example 6 | 0.4 | 0.4 | 113 | 112 | 111 | Good |
| Example 7 | 0.4 | 0.4 | 112 | 110 | 109 | Good |
| Example 8 | 0.4 | 0.4 | 111 | 109 | 107 | Good |
| Example 9 | 0.4 | 0.4 | 112 | 110 | 108 | Good |
| Example 10 | 0.4 | 0.4 | 109 | 108 | 107 | Good |
| Example 11 | 0.4 | 0.4 | 113 | 110 | 109 | Good |
| Example 12 | 0.4 | 0.4 | 108 | 107 | 107 | Good |
| Example 13 | 0.4 | 0.4 | 111 | 110 | 110 | Good |
| Comparative Example 1 | 0.4 | 0.4 | 105 | 94 | 90 | Good |
| Comparative Example 2 | 0.4 | 0.4 | 112 | 96 | 91 | Good |

TABLE 3

| | Coefficient of dynamic friction | | |
|---|---|---|---|
| | First time | Second time | Third time |
| Example 10 | 0.2209 | 0.2341 | 0.2195 |
| Example 11 | 0.1973 | 0.2007 | 0.1902 |
| Example 12 | 0.1374 | 0.1350 | 0.1473 |
| Example 13 | 0.1159 | 0.1154 | 0.1140 |

While the invention has been described in connection with certain embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. An optical member comprising a plastic substrate;

an antireflection film on the substrate, wherein an outermost layer from the substrate of the antireflection film is a layer containing, as a major component, vapor deposited silicon dioxide; and a fluorine-containing water-repellent layer is further externally provided on the outermost layer of the antireflection film, wherein the optical member has the following characteristics:

(1) after the water-repellent layer is initially provided, a stationary contact angle to water before rubbing of the water-repellent layer is at least 104°, (2) after a grade B chamois skin, as defined in KK-C-300C according to the Federal Specifications and Standards of U.S.A., is dipped in water at 25° C. for 5 minutes, and the surface of the water-repellent layer is then rubbed 10,000 times by the chamois skin while applying a load of 500 g, a stationary contact angle to water after rubbing of the water-repellent layer is from 0 to 10° smaller than the stationary contract angle to water before rubbing, and (3) a luminous reflectance of the optical member before providing the water-repellant layer is substantially identical to a luminous reflectance of the optical member after providing the water-repellant layer.

2. The optical member of claim 1, wherein the water-repellent layer is formed from a fluorine-substituted alkyl group-containing organosilicon compound.

3. The optical member of claim 1, wherein the water-repellent layer is formed from a fluorine-substituted alkyl group-containing organosilicon compound and a silicon-free perfluoropolyether.

4. The optical member of claim 2, wherein the fluorine-substituted alkyl group-containing organosilicon compound is represented by the following general formula (I):

(I)

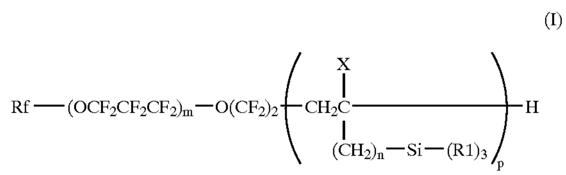

wherein Rf represents a linear perfluoroalkyl group having from 1 to 16 carbon atoms; X represents hydrogen or a lower alkyl group having from 1 to 5 carbon atoms; R1 represents a hydrolyzable group; m represents a number ranging from 1 to 50; n represents a number ranging from 0 to 2; and p represents a number ranging from 1 to 10.

5. The optical member of claim 3, wherein the fluorine-substituted alkyl group-containing organosilicon compound is represented by the following general formula (I):

(I)

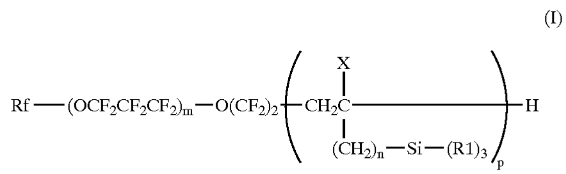

wherein Rf represents a linear perfluoroalkyl group having from 1 to 16 carbon atoms; X represents hydrogen or a lower alkyl group having from 1 to 5 carbon atoms; R1 represents a hydrolyzable group; m represents a number ranging from 1 to 50; n represents a number ranging from 0 to 2; and p represents a number ranging from 1 to 10.

6. The optical member of claim 2, wherein the fluorine-substituted alkyl group-containing organosilicon compound is represented by the following unit formula (II):

$$C_qF_{2q+1}CH_2CH_2Si(NH)_{1.5} \quad \text{(II)}$$

wherein q represents an integer of at least 1.

7. The optical member of claim 3, wherein the fluorine-substituted alkyl group-containing organosilicon compound is represented by the following unit formula (II):

$$C_qF_{2q+1}CH_2CH_2Si(NH)_{1.5} \quad \text{(II)}$$

wherein q represents an integer of at least 1.

8. The optical member of any one of claims 3, 5, 7, and wherein the silicon-free perfluoropolyether composes a unit represented by the following general formula (III):

$$\text{—(RO)—} \quad \text{(III)}$$

wherein R represents a perfluoroalkylene group having from 1 to 3 carbon atoms.

9. The optical member according to claim 8, wherein the silicon-free perfluoropolyether has a weight average molecule weight ranging from 1,000 to 10,000 g/mol.

10. A process of producing an optical member, comprising:

heating a solution containing a fluorine-substituted alkyl group-containing organosilicon compound diluted with a solvent in vacuum, to deposit a thin film on a substrate, and to form the optical member, wherein the heating comprises heating to a temperature in a range of from an evaporation initiation temperature of the organosilicon compound to a decomposition temperature of the organosilicon compound, and a time from initiation of heating of the organosilicon compound to completion of applying heat is within 90 seconds.

11. The process of producing an optical member of claim 10, wherein the solution containing a fluorine-substituted alkyl group-containing organosilicon compound further contains a silicon-free perfluoropolyether.

12. The process of producing an optical member of claim 10, wherein the fluorine-substituted alkyl group-containing organosilicon compound is represented by the following general formula (I):

(I)

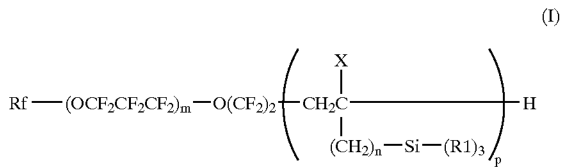

wherein Rf represents a linear perfluoroalkyl group having from 1 to 16 carbon atoms; X represents hydrogen or a lower alkyl group having from 1 to 5 carbon atoms; R1 represents a hydrolyzable group; m represents a number ranging from 1 to 50; n represents a number ranging from 0 to 2; and p represents a number ranging from 1 to 10.

13. The process of producing an optical member of claim 11, wherein the fluorine-substituted alkyl group-containing organosilicon compound is represented by the following general formula (I):

(I)

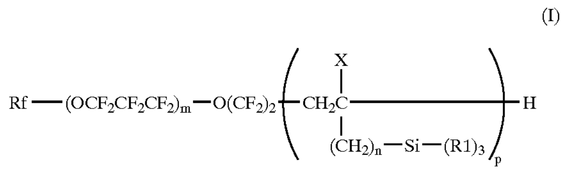

wherein Rf represents a linear perfluoroalkyl group having from 1 to 16 carbon atoms; X represents hydrogen or a lower alkyl group having from 1 to 5 carbon atoms; R1 represents a hydrolyzable group; m represents a number ranging from 1 to 50; n represents a number ranging from 0 to 2; and p represents a number ranging from 1 to 10.

14. The process of producing an optical member of claim 10, wherein the fluorine-substituted alkyl group-containing organosilicon compound is represented by the following general formula (II):

$$C_qF_{2q+1}CH_2CH_2Si(NH)_{1.5} \quad (II)$$

wherein q represents an integer of at least 1.

15. The process of producing an optical member of claim 11, wherein the fluorine-substituted alkyl group-containing organosilicon compound is represented by the following unit formula (II):

$$C_qF_{2q+1}CH_2CH_2Si(NH)_{1.5} \quad (II)$$

wherein q represents an integer of at least 1.

16. The process of producing an optical member of claim 11, wherein the silicon-free perfluoropolyether comprises a unit represented by the following general formula (III):

$$—(RO)— \quad (III)$$

wherein R represents a perfluoroalkylene group having from 1 to 3 carbon atoms.

17. The process of producing an optical member of claim 16, wherein the silicon-free perfluoropolyether has a weight average molecular weight of from 1,000 to 10,000 g/mol.

18. The process of producing an optical member of claim 10, wherein the solution containing a fluorine-substituted alkyl group-containing organosilicon compound is heated by an electron gun.

19. An optical member obtainable by the process of claim 11.

20. An optical member obtainable by the process of claim 12.

21. An optical member obtainable by the process of claim 14.

22. An optical member obtainable by the process of claim 16.

23. An optical member obtainable by the process of claim 18.

24. A process of producing a thin film, comprising:

heating a solution containing a fluorine-substituted alkyl group-containing organosilicon compound diluted with a solvent in vacuum, to deposit a thin film on a substrate, wherein the heating comprises heating to a temperature in a range of from an evaporation initiation temperature of the organosilicon compound to a decomposition temperature of the organosilicon compound, the temperature of the organosilicon compound does not exceed its decomposition temperature after the initiation of evaporation of the organosilicon compound until completion of vapor deposition, and heat evaporation of the solution is completed within 90 seconds after initiation of heating of the solution.

25. The process of producing a thin film of claim 24, wherein the heating of the solution containing an organosilicon compound comprises irradiation by an electron gun.

* * * * *